United States Patent
Wu et al.

(10) Patent No.: US 10,839,038 B2
(45) Date of Patent: Nov. 17, 2020

(54) GENERATING CONFIGURATION INFORMATION FOR OBTAINING WEB RESOURCES

(71) Applicant: Alibaba Group Holding Limited, George Town (KY)

(72) Inventors: Wei Wu, Beijing (CN); Yixing Zhang, Beijing (CN); Wei Ye, Beijing (CN)

(73) Assignee: Alibaba Group Holding Limited (KY)

( * ) Notice: Subject to any disclaimer, the term of this patent is extended or adjusted under 35 U.S.C. 154(b) by 99 days.

(21) Appl. No.: 16/147,021

(22) Filed: Sep. 28, 2018

(65) Prior Publication Data

US 2019/0102351 A1 Apr. 4, 2019

Related U.S. Application Data

(63) Continuation-in-part of application No. PCT/CN2017/077267, filed on Mar. 20, 2017.

(30) Foreign Application Priority Data

Mar. 29, 2016 (CN) .......................... 2016 1 0189318

(51) Int. Cl.
*G06F 15/16* (2006.01)
*G06F 16/957* (2019.01)
*H04L 29/08* (2006.01)
*G06F 16/955* (2019.01)

(52) U.S. Cl.
CPC ........ *G06F 16/9574* (2019.01); *G06F 16/955* (2019.01); *G06F 16/957* (2019.01); *G06F 16/9577* (2019.01); *H04L 67/02* (2013.01); *H04L 67/22* (2013.01); *H04L 67/34* (2013.01)

(58) Field of Classification Search
CPC .............. G06F 16/955; G06F 16/9574; G06F 16/9577; H04L 67/02; H04L 67/22; H04L 67/34
USPC ................ 709/203, 217, 219, 220, 221, 226
See application file for complete search history.

(56) References Cited

U.S. PATENT DOCUMENTS

| | | | |
|---|---|---|---|
| 9,225,794 B2* | 12/2015 | Roskind | G06F 16/95 |
| 2007/0266121 A1* | 11/2007 | Saeed | H04L 12/4641 |
| | | | 709/220 |
| 2009/0089109 A1* | 4/2009 | Rabetge | G06F 9/44505 |
| | | | 705/7.29 |

(Continued)

FOREIGN PATENT DOCUMENTS

| | | |
|---|---|---|
| CN | 103365965 | 10/2013 |
| CN | 103685381 | 3/2014 |
| CN | 103955495 | 7/2014 |

*Primary Examiner* — Liang Che A Wang
(74) *Attorney, Agent, or Firm* — Van Pelt, Yi & James LLP

(57) ABSTRACT

Generating configuration information for obtaining web resources is disclosed, including: obtaining user data collected by one or more client devices from the one or more client devices, wherein the user data pertains to client device information and online resource request information associated with at least one web source; analyzing the user data to generate configuration information associated with obtaining a plurality of sub-resources associated with the at least one web source; and sending the configuration information to a recipient client device, wherein the configuration information is configured to enable the recipient client device to obtain the plurality of sub-resources associated with the at least one web source.

20 Claims, 9 Drawing Sheets

(56) References Cited

U.S. PATENT DOCUMENTS

| | | |
|---|---|---|
| 2009/0125612 A1* | 5/2009 | Rabetge ............... H04L 67/306 |
| | | 709/220 |
| 2010/0235321 A1 | 9/2010 | Shukla |
| 2011/0066676 A1 | 3/2011 | Kleyzit |
| 2012/0317363 A1 | 12/2012 | Uola |
| 2017/0011133 A1 | 1/2017 | Shalunov |
| 2017/0048319 A1 | 2/2017 | Straub |

* cited by examiner

GENERATING CONFIGURATION INFORMATION FOR OBTAINING WEB RESOURCES

CROSS REFERENCE TO OTHER APPLICATIONS

This application is a continuation-in-part of and claims priority to International (PCT) Application No. PCT/CN2017/77267 entitled CONFIGURATION INFORMATION GENERATION AND TRANSMISSION METHOD, AND RESOURCE LOADING METHOD, APPARATUS AND SYSTEM filed Mar. 20, 2017 which is incorporated herein by reference in its entirety for all purposes, which claims priority to China Patent Application No. 201610189318.8 entitled A CONFIGURATION INFORMATION GENERATING AND SENDING METHOD, AND A RESOURCE LOADING METHOD AND DEVICE AND SYSTEM filed on Mar. 29, 2016 which is incorporated by reference in its entirety for all purposes.

FIELD OF THE INVENTION

The present application involves the field of communication technology. In particular, the present application includes techniques for generating configuration information.

BACKGROUND OF THE INVENTION

With the development of communication technology, in order to satisfy ever-increasing and varying service demands, the number of internet applications continues to grow.

At present, when an internet application is launched, resources typically need to be loaded to present the application. Furthermore, the volume of data that is needed to load the resources is typically substantial. Loading a large volume of data may be slow and lead to a degradation in user experience.

For example, the client device that is executing an internet application initiates an HTTP (HyperText Transfer Protocol) request to request retrieval of online resources from an application server and the application server returns the requested web page based on this online resource request. However, because sub-resources are embedded in this web page, the client device must also send additional HTTP requests to request retrieval of the embedded sub-resources and this process may be repeated multiple times until all resources are loaded and rendering is complete. This process of requesting embedded sub-resources in an application is typically quite time-consuming. When network conditions are poor, the delay in requesting embedded sub-resources is exacerbated and further negatively affects the user experience and can even make the application unusable.

Thus it can be seen that increasing the efficiency of resource loading of applications is now a problem in need of a solution.

SUMMARY OF THE INVENTION

The present application discloses techniques comprising:
obtaining user data collected by one or more client devices from the one or more client devices, wherein the user data pertains to client device information and online resource request information associated with at least one web source;
analyzing the user data to generate configuration information associated with obtaining a plurality of sub-resources associated with the at least one web source; and
sending the configuration information to a recipient client device, wherein the configuration information is configured to enable the recipient client device to obtain the plurality of sub-resources associated with the at least one web source.

The present application discloses further techniques comprising:
determining an online resource request for a web source;
determining stored configuration information associated with the online resource request;
using the stored configuration information to generate a plurality of requests associated with obtaining a plurality of sub-resources associated with the web source; and
using the plurality of requests to obtain the plurality of sub-resources.

BRIEF DESCRIPTION OF THE DRAWINGS

Various embodiments of the invention are disclosed in the following detailed description and the accompanying drawings.

DETAILED DESCRIPTION

Figure 1:
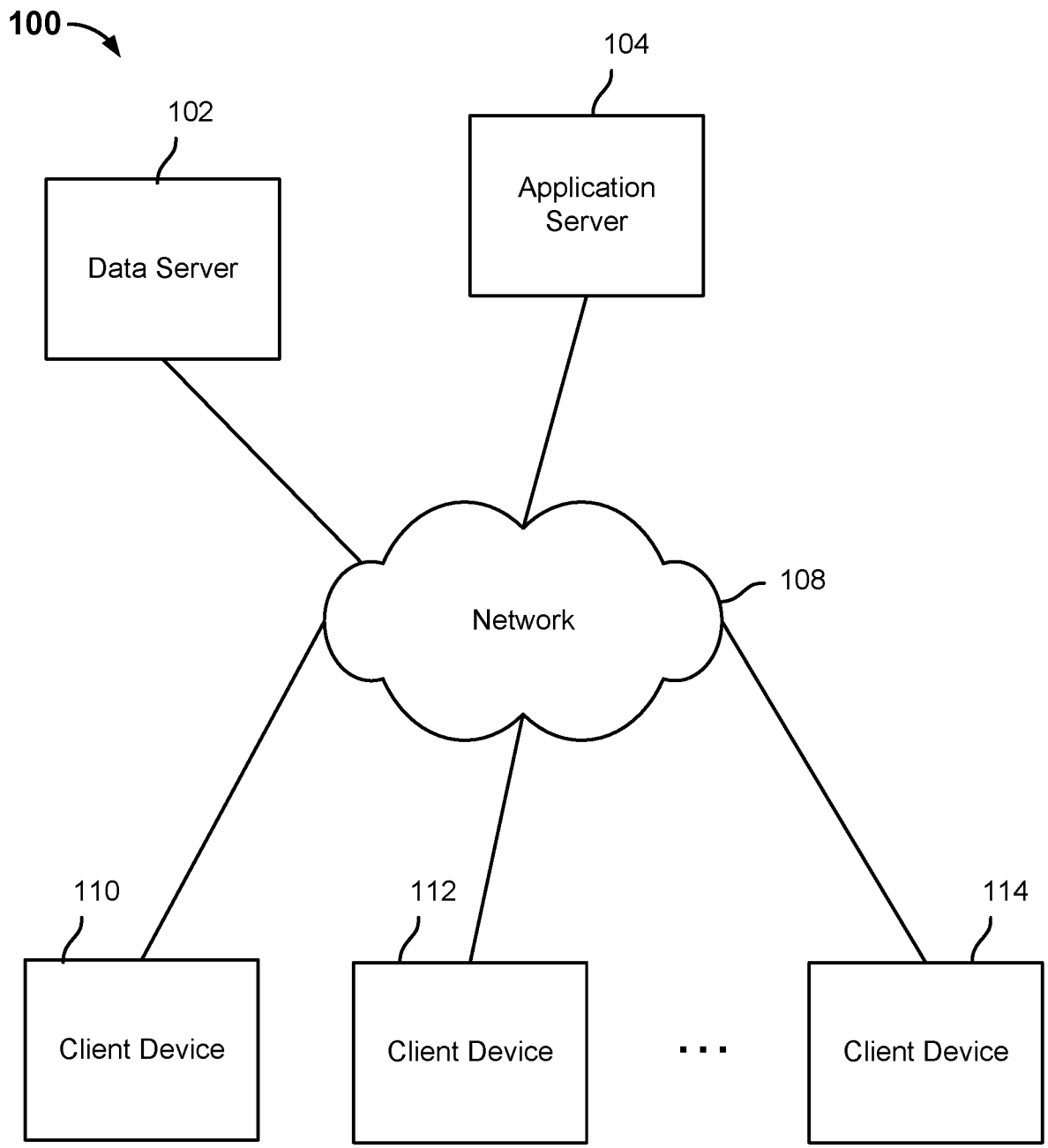
FIG. 1 is a diagram showing an embodiment of a system for generating configuration information for requesting web resources.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating configuration information for obtaining online resources are described herein. User data collected by one or more client devices is obtained from the one or more client devices. The user data pertains to client device information and online resource request information associated with at least one web source. For example, the "web source" may comprise a website or a web page. Client device information comprises features or attributes of the client device. Online resource request information comprises features or attributes of the requests for one or more web sources. The obtained user data is analyzed to generate configuration information associated with obtaining a plurality of sub-resources associated with the at least one web source. In various embodiments, a "sub-resource" comprises a resource that is to be embedded within, presented at, and/or otherwise used to render the web source. The configuration information is sent to a recipient client device. The configuration information is configured to enable the recipient client device to obtain the plurality of sub-resources associated with the at least one web source.

FIG. 1 is a diagram showing an embodiment of a system for generating configuration information for requesting web resources. System 100 includes data server 102, application server 104, network 108, client device 110, client device 112, and client device 114. Network 108 may comprise high-speed data networks and/or telecommunication networks (e.g., a wide area network, a local area network, the internet, or the internet using mobile communication technology). Each of data server 102, application server 104, client device 110, client device 112, and client device 114 may communicate to each other over network 108.

Each of data server 102 and application server 104 are installed with internet application server programs. Each of client devices 110, 112, and 114 are installed with internet application client programs. Each of client devices 110, 112, and 114 may be a mobile device, a mobile telephone, a personal digital assistant (PDA), a handheld computer, a personal computer, a wearable device, or any other type of computing device.

In some embodiments, each of client devices 110, 112, and 114 may access the internet wirelessly, while data server 102 and application server 104 may have wired connections to the internet.

Each of client devices 110, 112, and 114 and data server 102 can use cloud computing technology to achieve information processing. Each of client devices 110, 112, and 114, data server 102, and application server 104 can use operating systems that are based on cloud computing technology, such as the YunOS, thereby integrating the resources and services of the cloud and the client devices.

In various embodiments, each of client devices 110, 112, and 114 is configured to collect user data pertaining to client device information and online resource request information. Each of devices 110, 112, and 114 can use a variety of methods to collect user data. For example, a client device can use the buried point technique to collect user data. The buried point technique refers to code that is compiled in advance, and, at a certain stage or stages of system operation, the preset program code is invoked to realize certain preset functions. For example, the buried point technique may be executed by a client device as follows: during the client device's process of requesting or accessing online resources, program code configured to realize the function of user data collection is invoked to record the client device's operations to access services, including such information as the request connection, the IP address of the requestor, request parameters, the request results, etc.

In various embodiments, the user data that is collected by a client device includes online resource request information. For example, each online resource request is directed to application server 104 that is associated with hosting/implementing a particular website and where the online resource request is configured to obtain data regarding a particular web source (e.g., web page) in relation to the website. In various embodiments, the online resource request is configured to obtain web page data (e.g., markup data) from application server 104 and where the web page data is usable to present the requested web page. In various embodiments, the web page data requested by the online resource request includes data associated with page resources to be presented within the rendered web page. In various embodiments, a page resource associated with a web source (e.g., web page or website) is sometimes referred to as a "sub-resource." For example, the web page data that is requested by the online resource request includes the address information (e.g., uniform resource locator (URL)) of each sub-resource that is to be included in the rendered web page. After receiving the response (e.g., web page data) to the online resource request, the client device is configured to parse the received web page data to obtain the URLs corresponding to the sub-resources and use the URLs to make separate requests for the sub-resources of the web page. Once the sub-resources are obtained, the client device is configured to use the obtained sub-resources to render the originally requested web page.

This online resource request information that is part of the collected user data at a client device may include relevant information at the time the client device initiated the online resource request and may further include relevant information regarding the result/response of the online resource request. For example, the collected online resource request information may comprise one or any combination of the following kinds of information:

- the time that the sub-resource(s) were loaded based on the online resource request.
- the uniform resource locator(s) (URLs) of the sub-resource(s) that were loaded for the online resource request; further, the sub-resource URL(s) may contain resource parameters, for example, the resolution for images, or, for another example, for page requests related to payments, the URL may contain the user's payment account.
- the type of sub-resource loaded by the online resource request; for example, if the loaded sub-resource is an image type or a video; or, for another example, if the loaded sub-resource is a static resource (for example, images, videos, text) or a dynamic sub-resource (such as payment result data, etc.).

the type of online resource request; for example, if the requested resource is a static resource (such as, for example, a static web page, which contains such content as images, videos, or text) or a dynamic resource (such as, for example, a dynamic web page, such as a payment page).

information about the resource cache server from which each of one or more sub-resources is loaded based on where the online resource request originated, such as the IP address of the resource cache server from which a sub-resource was obtained.

In various embodiments, the user data that is collected by a client device includes client device information. For example, the client device information may include one or any combination of the following kinds of information:

information about the operating system used by the client device; for example, the version number of the operating system, the languages supported by the operating system, etc.

information about the operator (e.g., service provider) that is used by the client device;

equipment information of the client device, such as the type, model number, and brand of the client device, and possibly also including such information as the media access control (MAC) address.

the location information of the client device.

Each of client devices 110, 112, and 114 may submit the collected data to data server 102 at set periods or set times, or they may submit the collected user data to data server 102 when instructed to do so by data server 102 or application server 104.

In some embodiments, each of client devices 110, 112, and 114 is configured to submit its collected user data to data server 102. In response, data server 102 is configured to analyze the user data that is obtained from across multiple client devices, including client devices 110, 112, and 114, to generate configuration information. In various embodiments, configuration information includes resource loading information that is usable to obtain sub-resources with respect to one or more web pages. For example, configuration information may include for each web page (e.g., that is identified by a unique URL), a list of sub-resources where the configuration information further includes for each sub-resource: the name of the sub-resource, the URL of the sub-resource, the Software-defined networking (SDN) node or IP address from which to obtain the sub-resource, and any one or more parameters associated with the sub-resource. In some embodiments, the configuration information further includes different information usable to obtain sub-resources for each web page for each different context (e.g., time period) in which the requests to the sub-resources are made. In some embodiments, application server 104 is configured to retrieve the configuration information from data server 102 and send it to each of one or more of client devices 110, 112, and 114. In some embodiments, data server 102 directly sends the generated configuration information to each of one or more of client devices 110, 112, and 114 without sending the configuration information to application server 104 first. In some embodiments, data server 102 and application server 104 are configured to act as a single server that performs the functions of data server 102 and application server 104.

After receiving the configuration information (e.g., from either data server 102, application server 104, or both), each of client devices 110, 112, and 114 is configured to locally store the configuration information. When one of client devices 110, 112, and 114 subsequently generates an online resource request for a web page for which the stored configuration information stores relevant information, the client device does not need to send the online resource request to application server 104 associated with that web page but can rather, look up the stored configuration information to determine the relevant information that is usable to obtain sub-resources that are to be presented within the web page. The relevant information that is looked up by the client device from within the stored configuration information is information that is relevant to the requested web page, relevant to the dimensions of the client request, and/or relevant to the context (e.g., the time of the day, the location of the client device) in which the online resource request is made. In various embodiments, a "dimension" refers to a characteristic or attribute. The client device then uses the looked up information from the configuration information to immediately make separate requests for the page resources of the web page without needing to wait until application server 104 responds to the initial online resource request with the requested web page data. The client device can then store (e.g., cache) the obtained sub-resources of the web page locally (e.g., at an HTTP cache) until the web page data is received, after which the web page can be rendered using the cached sub-resources and the obtained web page data. As such, using the configuration information, the client device can make (at least partially) concurrent requests for sub-resources on a web page, along with the online resource request for the data (e.g., mark-up language) of the web page. Without the configuration information, the client device would need to send the online resource request to application server 104, wait to receive the requested web page data, receive the requested web page data, parse the requested web page data to obtain information (e.g., URLs) usable to obtain the sub-resources, and then use the parsed information to make requests for the sub-resources. In instances where sub-resources of the web source are hierarchical (e.g., one sub-resource is configured to request to another sub-resource, thereby creating a serial sequence of requesting sub-resources), the configuration information can be used to request for the sub-resources of the web source at least partially in parallel, regardless of whether the sub-resources are hierarchical. After receiving the requested web page data and sub-resource data, the client device can render the web page and present it at its screen for the user. By being able to request sub-resources for a web page using the configuration information in parallel with making an online resource request for the web page, the client device does not have to wait to receive and then parse the requested web page data before requesting the sub-resources. The client device can then, for example, cache the obtained sub-resources and use the cached sub-resources to render the web page after receiving the web page data (e.g., markup language) associated with the web page. As a result, the client device is therefore able to more efficiently obtain the requested content and to render the web page.

Figure 2:
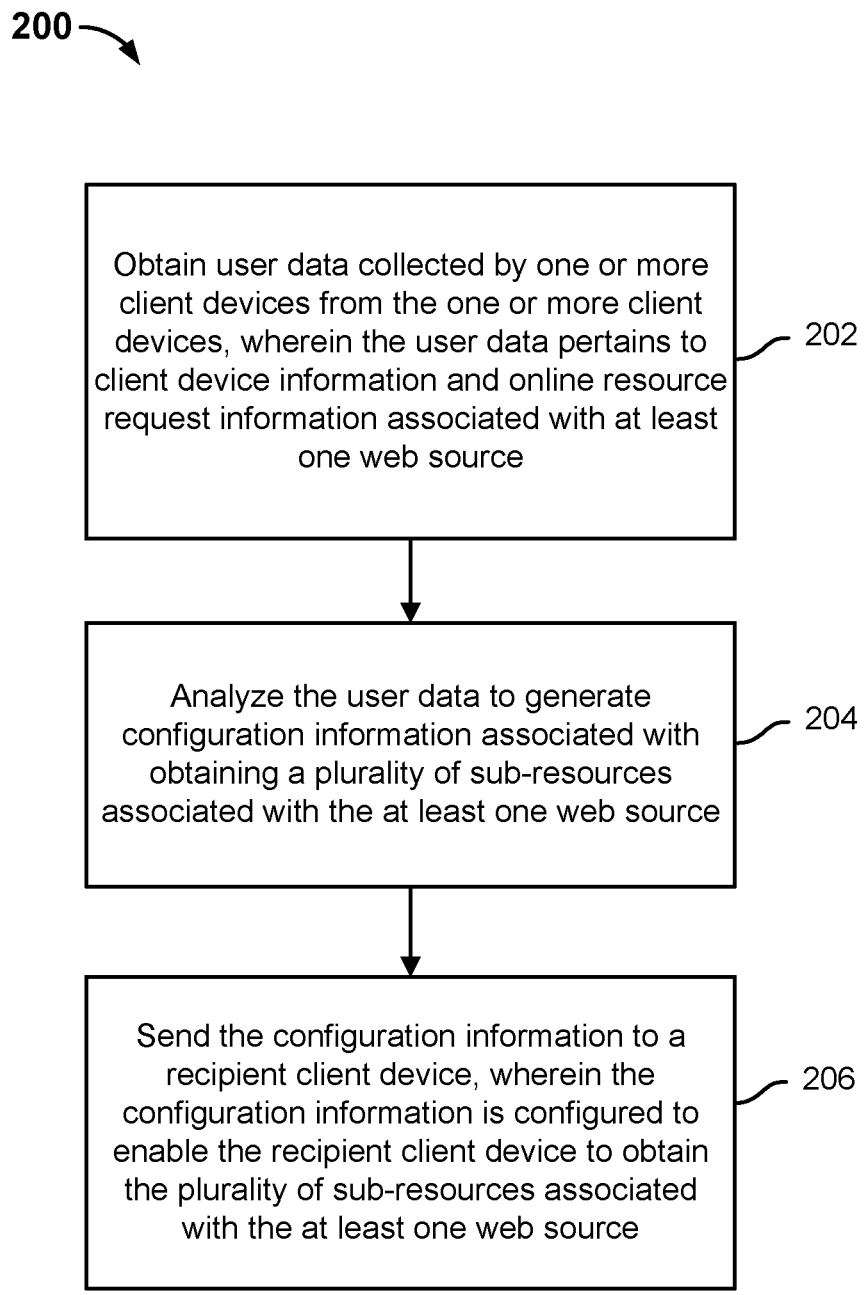
FIG. 2 is a flow diagram showing an embodiment of a process for generating configuration information for requesting web resources.

FIG. 2 is a flow diagram showing an embodiment of a process for generating configuration information for requesting web resources. In some embodiments, process 200 is implemented on at least one of data server 102 and application server 104 of FIG. 1.

At 202, user data collected by one or more client devices is obtained from the one or more client devices, wherein the user data pertains to client device information and online resource request information associated with at least one web source. In various embodiments, a "web source" comprises a web page or a website.

As web sources are requested by the client device (e.g., in response to a user selection or a call that is programmatically generated by an application), the online resource request information and client device information associated with each request for a web source are collected as user data. The online resource request information that is included in the collected user data includes information pertaining to the online resource requests as well as the results and/or responses to the online resource requests. For example, an online resource request is sent to an application server to obtain web page data associated with a web source. The web page data is the response to the online resource request. The web page data is then parsed to obtain information associated with the sub-resources that need to be obtained in order to render the web page. For example, the information associated with the sub-resources includes the names of the sub-resources, URLs at which the sub-resources can be found, the cache servers where the sub-resources are stored, the parameters associated with the sub-resources, etc.

The client device information that is included in the collected user data comprises features or attributes of the client device. The client device information may include static information (e.g., operating system used by the client device, the operator that is used by the client device, the equipment type of the client device, etc.) and dynamic information (e.g., the current location of the client device when the client device had sent out the collected user data). Online resource request information comprises features or attributes of requests for one or more web sources. The online resource request information may include information such as, for example: the URL of the web page that is identified by the online resource request; the online resource type; the online resource request type; and the URLs, names, parameters, and storage locations of sub-resources that are included in the web page.

In some embodiments, collected user data is periodically received from client devices. For example, the user data is received from the client devices via HTTP protocol. In some embodiments, user data is received in response to requests to obtain user data.

At 204, the user data is analyzed to generate configuration information associated with obtaining a plurality of sub-resources associated with the at least one web source.

The user data that is obtained from across one or more client devices may be analyzed across multiple dimensions. For example, the dimensions of the client device can be used to tabulate the user data collected by the client device and/or the dimensions of the online resource request can be used to tabulate the user data collected by the client device, and/or a combination of multiple dimensions can be used to tabulate the user data collected by the client device. In some embodiments, because the user data associated with different online resource request dimensions and/or different client device dimensions may be different (e.g., different URLs and SDN nodes may be indicated for the same sub-resources that are requested by different types of client devices and/or obtained in different contexts), "tabulating" user data may include classifying the user data along different online resource request information dimensions and client device information dimensions. For example, the obtained user data that is relevant to client device dimensions A, B, and C may be classified together and/or the obtained user data that is relevant to online resource request dimensions D and F may be classified together, etc. In some embodiments, the configuration information includes the tabulated user data, which comprises user data that has been classified/sorted across different online resource requests and/or client device dimensions.

In some embodiments, "tabulating" may also include counting the frequency that each client dimension device and each online resource request dimension appears, alone and/or in combination with each other, within the obtained user data. In some embodiments, user data associated with the most frequently appearing client device dimensions, online resource request dimensions, and combinations of client device and online resource dimensions are included in the configuration information.

For example, the following are examples of dimensions of the client device and example corresponding tabulations:
  the operating system used by the client device. For example, a tabulation can be performed based on the type, version, and languages supported by the operating system used by the client device.
  the operator that is used by the client device. For example, a tabulation can be based on the operator used or the network accessed by the client device.
  the equipment type of the client device. For example, a tabulation can be based on the model or brand of the client device.
  the location of the client device. The client device's submission location can reflect the location of the client device when it collected or submitted the user data and can be obtained by the client device using a GPS module, or it can be obtained using other techniques.

For example, the following are examples of dimensions of the online resource request and example corresponding tabulations (e.g., classifications of user data along the following dimensions):
  the URL of a web source that is identified by the online resource request.
  the types of sub-resource(s)s to be obtained for a web source.
  the types of web sources.
  the URLs, names, parameters, and storage locations of sub-resources that are included in the web page.

Based on the example dimensions described above, regarding online resource requests for the same online resource, differences may exist in one or more of the following example areas:
  the resource loading information corresponding to different sub-resource types. For example, the respective corresponding resource loading information for a request to access an image resource on Website A and for a request to access a video resource on Website A are different.
  the resource loading information corresponding to different online resource request types. For example, the respective corresponding resource loading information for online resource requests to access static web pages and for online resource requests to access dynamic web pages are different.
  the resource loading information corresponding to different client device operating systems. For example, the respective corresponding resource loading information for an operating system that supports the Chinese language and for an operating system that supports the English language are different.
  the resource loading information corresponding to different operators.
  the resource loading information corresponding to different client equipment types is different. For example, owing to differences in the equipment type of the client device, the resources returned by the cache server may be different. For instance, there could be differences in the resolution of images, thus resulting in different resource loading information corresponding to different client device equipment types.

the resource loading information corresponding to different locations. For example, based on the arrangements of the CDN (content delivery network), when client devices in different locations make online resource requests, the CDN node or the resource cache server of the sub-resource that is provided by the network side may be different, thus resulting in differences in the resource loading information corresponding to different locations.

the resource loading information corresponding to different online resource request times. For example, depending on when a request to a sub-resource is made, different amounts of traffic may be historically handled by different cache servers. As a result, if a request to a sub-resource were made in the morning, a load balancer may direct the request to be processed by a first cache server whereas if the request to the same sub-resource were made in the afternoon, the load balancer may direct the request to be processed by a second cache server.

In various embodiments, the resource loading information may comprise one or more of the following kinds of information: the URL of the sub-resource, the sub-resource parameters (for example, image resolution), and the address of the CDN node or the resource cache server from which to obtain the sub-resource.

For example, an online resource request is for the web page with URL "alios.cn." Online resource request information that can be derived from this online resource request includes the HTTP referrer header that can be used to generate a URL referrer tree with the root "alios.cn" and first level descendant URLs and the second level descendant URLs from a root/parent URL. A first level descendant URL pertains to a sub-resource that is requested by the web page data and a second level descendant URL pertains to a sub-resource that is requested by a sub-resource that is associated with a first level descendant URL. By analyzing online resource request information across obtained user data, the URLs of requested sub-resources for the web page with URL "alios.cn" are tabulated across different client device dimensions (e.g., operating system, equipment type, client device location, operators) to determine correspondences between URLs (along with parameter information and other information) for sub-resources belonging to the web page with URL "alios.cn" and their corresponding client device dimensions to be included in configuration information.

When tabulating the user data, the various dimensions described above can be used separately and they can be used in combination. The dimensions enumerated above are only exemplary, and the embodiments of the present application are not limited to the dimensions enumerated above.

At 206, the configuration information is sent to a recipient client device, wherein the configuration information is configured to enable the recipient client device to obtain the plurality of sub-resources associated with the at least one web source.

The generated configuration information is sent to a client device. In some embodiments, the recipient client device may be a client device that had collected user data and that had sent the collected user data to the server that had generated the configuration information. In various embodiments, the configuration information includes at least the URL corresponding to each web source to which an online resource access request was sent. In some embodiments, the configuration information may include for each web source/page (e.g., that is identified by a unique URL), a list of sub-resources where the configuration information further includes for each sub-resource: the name of the sub-resource, the URL of the sub-resource, the (e.g., software defined networking) node or IP address from which to obtain the sub-resource, and any one or more parameters associated with the sub-resource. The configuration information may include different information for different client device dimensions. In some embodiments, the configuration information further includes different information usable to obtain sub-resources for each web page at each different context (e.g., time period and/or location of the requesting client device) in which requests to the sub-resources are to be made. For example, the configuration information may include for the same web source (e.g., web page) but associated with different types of client devices and/or associated with a different time of requesting the web source: a different URL from which to obtain a sub-resource, a different (e.g., software defined networking) node or IP address from which to obtain the sub-resource, and any one or more different parameters associated with the sub-resource.

After a client device receives and stores configuration information, when the client device subsequently initiates an online resource request for a web page (e.g., in response to a user selection at an application), the configuration information is used by the client device to load the sub-resources associated with the web page. Because the configuration information is obtained based on tabulation of user data, and, as described previously, the user data may contain information concerning the online resource request results (e.g., obtained sub-resources for the web page identified by each online resource request), such as the URLs of all sub-resources loaded for a certain online resource request, the configuration information for a single online resource request may, for example, include at least the URLs of all the sub-resources that need to be loaded for a particular online resource request. In this way, the client device can look up the URL associated with the online resource request within the configuration information and then find the corresponding URLs of all of the sub-resources (e.g., images, videos, Javascript, CSS file, etc.) that need to be obtained for the web page associated with the single resource request. For example, the client device can search through the configuration information for the information that is relevant to the dimensions of that client device (e.g., the same client device type, the same operating system used by the client device, the same carrier used by the client device) and then use this relevant portion to load the sub-sources to the requested web source. Then, the client device can send one or more requests for the sub-resources (e.g., simultaneously or at least partially concurrently) from their respective storage locations (e.g., cache servers, content nodes) and load the resources based on these sub-resource URLs, instead of waiting to receive the web page data from application server 104 of the web page, parsing the received web page data to obtain the sub-resource URLs, and then sending the request for the sub-resources. By using the configuration information, the client device is able to simultaneously request for sub-resources of a web page without needing to wait until the web page data is returned by the application server, which thereby improves the efficiency of resource loading.

Furthermore, because the configuration information is generated based on user data collected from, typically, multiple client devices, the configuration information may include information for even web sources that a recipient client device of the configuration information had never requested before. As such, even though a recipient client device of the configuration information has never requested Web Site A and therefore cannot benefit from web data that it could have cached locally when Web Site A was requested at the client device, the client device can still use the configuration information to quickly retrieve sub-resources for Web Site A (assuming that the configuration information includes information pertaining to Web Site A).

In some embodiments, the configuration information can be saved as a variety of data structures. For example, it can be saved as a configuration file, a tree data structure, or as a database table.

Furthermore, the user data collected that is collected by different client devices can reflect the usage habits and preferences of users. In some embodiments, when tabulating the user data, a time element of usage is used as one of the tabulation dimensions. For example, based on analysis and tabulation of user data, the data server can obtain: for website A, during the morning hours, there was a relatively greater number of users browsing the news page of this website A, and during the midday hours, there was a relatively greater number of users requesting music resources provided by website A. Therefore, the configuration information may include a table corresponding to the morning hours and another table corresponding to the midday hours that are based on tabulating (e.g., counting the number of times) the user data pertaining to online resource requests targeting website A that were sent during the morning hours and during the midday hours, respectively. As such, the resource URLs contained in the configuration information tables corresponding to these two time segments are different, where the table corresponding to the morning hours contains news resource URLs and the table corresponding to the midday hours contains music resource URLs.

In some embodiments, configuration information is periodically updated using the new user data that is collected by and obtained from client devices. The updated configuration is then sent to one or more client devices.

In the event that process 200 was performed by a data server, the data server can send the configuration information to an application server so that the application server can send the configuration information to the client device(s). In other embodiments, the application server can also forward configuration information retrieval requests (e.g., that had originated from client devices) to the data server, and based on these configuration information retrieval requests, the data server sends the configuration information requested by the application server back to the application server for the application server to distribute to client device(s).

Figure 3:
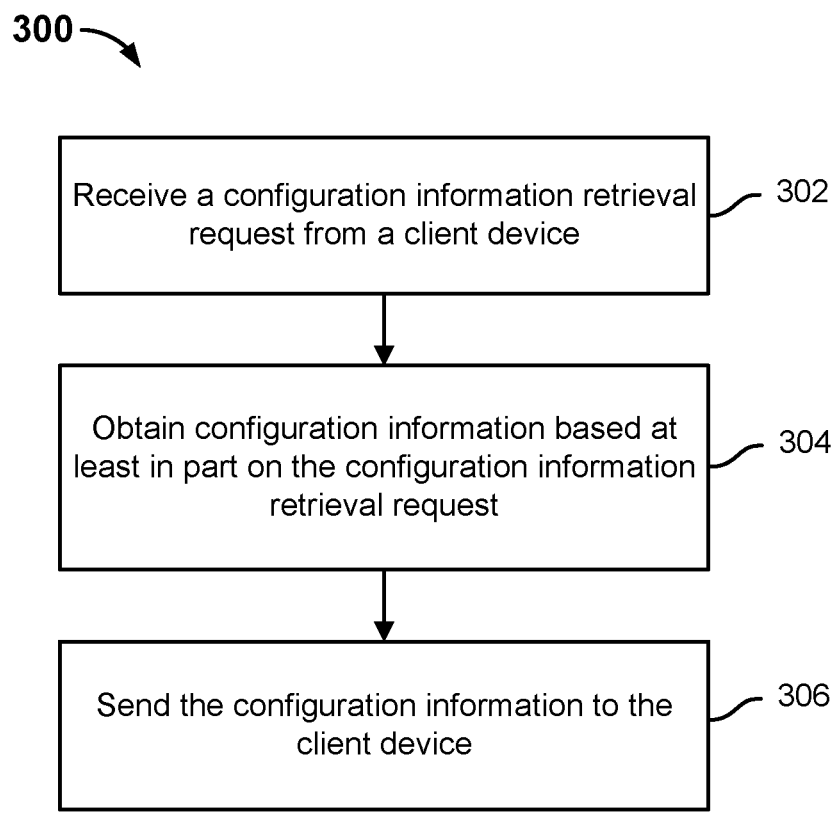
FIG. 3 is a flow diagram showing an embodiment of a process for sending configuration information to a client device.

FIG. 3 is a flow diagram showing an embodiment of a process for sending configuration information to a client device. In some embodiments, process 300 is implemented by at least one of data server 102 and application server 104 of FIG. 1.

At 302, a configuration information retrieval request is received from a client device.

A configuration information retrieval request includes information that is usable to obtain a requested set of configuration information. The set of configuration information may be used by the requesting client device to efficiently load sub-resources associated with one or more web sources (e.g., web pages or websites). Sets of configuration information may be generated based on the example techniques that were described above for FIG. 2.

In some embodiments, a client device may periodically send configuration information retrieval requests to an application server and/or a data server such that the client device would be able to receive and store updated configuration information locally. Then, when the client device needs to load a web source, the client device can use the locally stored configuration information to complete the loading process.

In some embodiments where the configuration information retrieval request is received at an application server, the application server may forward the configuration information retrieval request to the data server and then receive the requested configuration information from the data server. In some embodiments, the data server may also initiate the sending of sets of configuration information to the application server. In some embodiments, the application server can send batches of configuration information retrieval requests to the data server at fixed periods. In some embodiments, the application server can forward a configuration information retrieval request to the data server shortly after it receives such a request from a client device.

The configuration information retrieval request sent by the client device may include, for example, one or more of the following types of information:

version information of the configuration information, such as the version number of the configuration file saved on the client device. If the version number of the configuration file is contained in the client device's configuration information retrieval request, then the version number is useful in determining whether a newer version number of the requested configuration information is available (so that configuration information that is not of a newer version is not sent to the client device to save online resource overhead).

the operating system used by the client device.

the operator that is used by the client device.

equipment information of the client device. For example, equipment information may comprise one or more of the following: the MAC address, the equipment type, and the brand of the client device.

the location of the client device. If the location information of the client device is contained in the configuration information retrieval request, then the location information can be used as a basis to retrieve matching configuration information that corresponds to the location.

online resource request information. Examples include such information as the URL of the online resource (e.g., the URL of website A) and the request type (e.g., status web page or dynamic web page). If the online resource request information is contained in the client device's configuration information retrieval request, then this information is usable to retrieve matching configuration information for this online resource request.

At 304, configuration information is obtained based at least in part on the configuration information retrieval request.

In some embodiments where the configuration information retrieval request is received at an application server, the application server may obtain the requested configuration information locally or from a remote source (e.g., by querying the data server).

In some embodiments, the configuration information that is relevant to the configuration information retrieval request may be obtained by looking up (e.g., querying) generated sets of configuration information using one or more dimensions of information that are included in the request. For example, the one or more dimensions of information that are included in the request may pertain to the client device, online resource requests, or both.

For example, the dimensions of the client device may comprise one or any combination of the following:
the operating system used by the client device.
the operator that is used by the client device.
the equipment information of the client device.
the location of the client device.

For example, the dimensions of the online resource request may comprise one or any combination of the following:
the URL of the online resource.
the type of online resource.
the type of online resource request.

The dimensions enumerated above are merely exemplary, and the embodiments of the present application are not limited to the aforementioned dimensions enumerated above.

In some embodiments, the generated sets of configuration information may be stored at a table (e.g., which could be stored at the application server, the data server, or both).

For example, if the configuration information retrieval request sent by the client device contains the equipment type information of the client device and the location information of the client device, then the application server can take this equipment type information of the client device and location information of the client device as query conditions to generate a query, and use this query to search the configuration information table to obtain the relevant portion of the generated configuration information that needs to be sent to the client device.

At 306, the configuration information is sent to the client device.

In this step, the application server can package the configuration information that needs to be sent to the client device into a file format and send it to the client device via HTTP protocol.

In some embodiments, in order to reduce online resource overhead associated with transmitting content over a network, only portions of configuration information that are updated relative to the configuration information that is already stored at the client device are sent to the client device. This form of updating is sometimes referred to as the incremental update. For example, where the configuration information retrieval request includes the version number of the configuration information that is saved on the client device, the current version (e.g., that highest version) that exists of the configuration information may be obtained and the difference in those sets of configuration information can be obtained. Then, the differences between the current version of the configuration information and the configuration information associated with the version number that is provided by the client device are sent to the client device.

Figure 4:
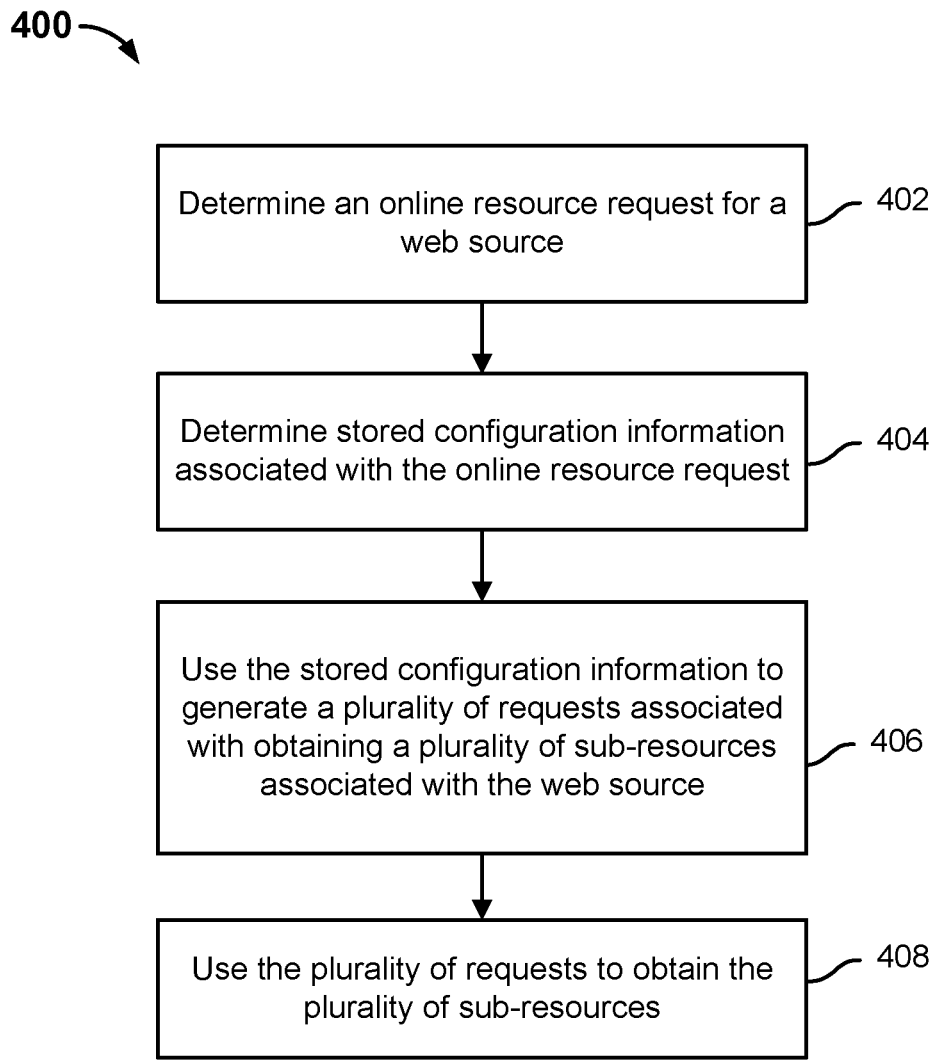
FIG. 4 is a flow diagram showing an embodiment of a process for using configuration information for requesting web resources.

FIG. 4 is a flow diagram showing an embodiment of a process for using configuration information for requesting web resources. In some embodiments, process 400 may be implemented, at least in part, on one of client devices 110, 112, and 114 of system 100.

At 402, an online resource request for a web source is determined.

For example, the online resource request to a web source is generated in response to a user interaction at the client device. For example, the user selects a control associated with opening or a link to a website. For example, the online resource request may comprise an HTTP request for the website.

At 404, stored configuration information associated with the online resource request is determined.

In some embodiments, the online resource request and/or other contextual data is used to determine a matching set of configuration information that is stored locally at the client device. The following are example pieces of contextual data:
the current location of the client device. The current location of the client device can be obtained using a GPS module or obtained by other techniques.
the current time.

The retrieved set of configuration information is used to obtain the resource loading information. The following are example types of resource loading information:
the URL of the web resource.
names of sub-resources associated with the web source.
web addresses (e.g., URLs) at which the sub-resources associated with the web source are to be found.
the parameters (e.g., image resolution, etc.) of the sub-resources associated with the web source.
the addresses of the cache servers (e.g., SDN nodes) at which the sub-resources associated with the web source are stored.

At 406, the stored configuration information is used to generate a plurality of requests associated with obtaining a plurality of sub-resources associated with the web source.

Based on the resource loading information that is determined from the matching set of configuration information, the client device can generate a corresponding request for each sub-resource to be obtained for the web source to be loaded. The client device may then send the requests for respective sub-resources to their resource sources (e.g., cache servers) in parallel. Examples of a sub-resource include an image, a video, audio files, CSS files, and a JavaScript (JS) script. In some embodiments, the client device is configured to also send the online resource request to the application server of the web source (e.g., to obtain mark-up language) to be used to render the web source. The online resource request may also be sent in parallel to the requests for the sub-resources. In contrast, conventional resource retrieval usually requires sending an online resource request for the web page data associated with a home page of a web source, receiving the web page data, parsing the web page data for information associated with the sub-resources to be used to load the web source, and finally sending out requests for the sub-resources based on their web addresses that were found in the web page data, which is usually a slower process because the web page data needs to be obtained first and then parsed before the sub-resources can be requested.

For example, the set of configuration information that was sent to the client device could have been determined based on information such as, for example, the equipment type of the client device, the operating system used by the client device, and the operator used by the client device. As a result, the configuration information that is received at the client device is typically compatible with the client device in multiple respects.

In some embodiments, the configuration information stored at the device includes different resource loading information for the sub-resources of a web source for different contextual data associated with the client device.

Specifically, the configuration information stored at the device includes different resource loading information for the sub-resources of a web source depending on the current time and/or the current location of the client device. For example, the configuration information may include a first set of resource loading information for sub-resource A when the request is to be made in the morning and include a second set of resource loading information for sub-resource A when the request is to be made in the evening. This way, the contextual data associated with the client device may be used in obtaining the most relevant resource loading information for a given web source that is to be rendered at the client device.

At 408, the plurality of requests is used to obtain the plurality of sub-resources.

The requests for the sub-resources are sent to their respective storage locations (e.g., cache servers). In some embodiments, the requests for sub-resources are sent simultaneously and/or at least partially concurrently with respect to each other. In some embodiments, the online resource request is also sent to the application server associated with the web source to obtain the web page data associated with the web source. In some embodiments, the online resource request is sent simultaneously and/or at least partially concurrently with respect to the requests for the sub-resources. As a result of the simultaneous and/or at least partially concurrent transmission of the requests for the sub-resources and/or the online resource request, the requests for the sub-resources and/or the online resource request may be processed in parallel, which leads to more efficient retrieval of the sub-resources and/or the web page data. In contrast, in conventional systems, the retrieval of the sub-resources typically does not occur until after the web page data associated with a requested web source is obtained from the application server and also the web page data is parsed for the web addresses (e.g., URLs) and/or other parameters of the sub-resources. Only after the web addresses (e.g., URLs) and/or other parameters of the sub-resources are obtained from the parsing of the web page data can requests for the sub-resources be generated and sent. As such, conventionally, transmission of the requests for the sub-resources of a web source cannot be parallelized with the online resource request for the web page data.

The obtained sub-resources and/or the web page data is used to load and render the web source. The rendered web source is presented at the display screen of the client device.

As one example, the configuration information saved on Jack's mobile telephone is shown in Table 1, below:

TABLE 1

| | | List of Sub-Resources at the Web Source | | |
|---|---|---|---|---|
| Web Source | Sub-Resource name | URL | Software Defining Network (SDN) node or IP address | Parameters |
| Website A (URL A) | Image | URL 1 | IP address 1 | Resolution parameters |
| | Video | URL 2 | IP address 1 | Video format parameters |
| | CSS file | URL 3 | IP address 2 | |
| | JS script | URL 4 | IP address 2 | |
| Website B (URL B) | CSS file | URL 5 | IP address 2 | |
| | JS script | URL 6 | IP address 2 | |
| | Video | URL 7 | IP address 1 | Video format parameters |

Table 1 contains the resource loading information that corresponds to the web sources of Website A and Website B.

(For example, while not indicated in Table 1, the configuration information shown in Table 1 may have been tabulated/classified for client devices with dimensions X, Y, and Z. The configuration information on Jack's mobile telephone may therefore additionally include information other than what is shown in Table 1, such as configuration information for client devices with dimensions Q, W, and E.) Taking the example of Website A, the resource loading information corresponding to Website A comprises a list of all sub-resources that are needed to load the homepage of Website A. As such, the home page of Website A may be loaded after this list of sub-resources has been retrieved. Specifically, this list of sub-resources includes the URLs of multiple sub-resources, the IP addresses of the Software Defining Network (SDN) (e.g., cache) nodes of the relevant sub-resources, and the parameters of the relevant sub-resources. For example, for the image-type sub-resource to be retrieved for Website A, the table includes the resolution parameters (e.g., size, quality, format, etc.) for this image. When the client device generates a request to obtain this image for Website A, the resolution parameters that are included in Table 1 may be included in the request to ensure that the image of the correct resolution is obtained. In another example, for the video-type sub-resource to be retrieved for Website A, the table contains the video format parameters (e.g., file type, quality, etc.) for this video. When the client device generates a request to obtain this image for Website A, the format parameters that are included in Table 1 may be included in the request to ensure that the image of the correct format is obtained.

For example, Jack opens the web browser on his client device, enters the web address for Website A (URL A) in the address bar, and then taps the "search" function key. Website A is a comprehensive portal that includes sections such as news and music.

In accordance to some embodiments, the web browser sends an HTTP request to an application server to request retrieval of the home page of Website A. Simultaneously and/or in parallel, the web browser searches through stored configuration information such as Table 1, above, using the address of Website A and to obtain matching/relevant resource loading information corresponding to Website A. The obtained resource loading information includes information such as the names and URLs of all sub-resources (e.g., an image, a video, a CSS file, a JS file) that are to be loaded in the home page of Website A, the addresses of the SDN nodes that provide the relevant sub-resources, and the relevant parameters (if any) of the sub-resources.

Based on the obtained resource loading information, the web browser constructs HTTP requests corresponding to the respective sub-resources and sends them to their respective SDN nodes in order to retrieve these sub-resources and load them for Website A.

If the conventional approach were used to obtain sub-resources for Website A, the web browser would first send the HTTP request to the application server associated with Website A for the home page for Website A. After the web page data associated with the home page is received, the URLs and/or other parameters associated with the sub-resources of Website A are parsed and obtained from the web page data and then HTTP requests can be sent to obtain the sub-resources. If there are multiple levels of sub-resources, then the requesting process described above is repeated until all sub-resources have been fully retrieved before completing the loading and rendering of the page. In short, the conventional approach is not able to parallelize requests for sub-resources of Website A or parallelize requests for the web page data of Website A and also the sub-resources of Website A, in contrast to the embodiments described herein.

In some embodiments, the client device is configured to generate configuration information locally based on user data that is collected locally. For example, the client device is configured to analyze the locally collected user data including, for example, by determining the frequency that certain sub-resources of a web source are requested, along various different client device dimensions, and/or at various different contexts (e.g., times and/or locations). After configuration information is generated and then stored at the client device, when the client device is to send a subsequent online resource request for a web source, the client device is configured to check the locally stored configuration information to determine whether relevant resource loading information can be found. If relevant resource loading information can be found, then the resource loading information that is found from the stored configuration information is used to generate and send requests for the sub-resources that are needed to render the web source. Otherwise, if the relevant resource loading information cannot be found from the configuration information, then the online resource request is sent to a corresponding application server.

In some embodiments, the client device can also synchronously provide the locally generated configuration information to other client devices, for example, using such means as social tools to synchronously provide this configuration information to other client device users that have the same or similar characteristics as the client device. In this way, other client devices can also perform resource loading based on this configuration information.

In some embodiments, the client device can also send the locally generated configuration information to the application server, and the application server can synchronously provide it to other client devices that have the same or similar characteristics as the client device, so that the other client devices can also perform resource loading based on this configuration information.

Figure 5:
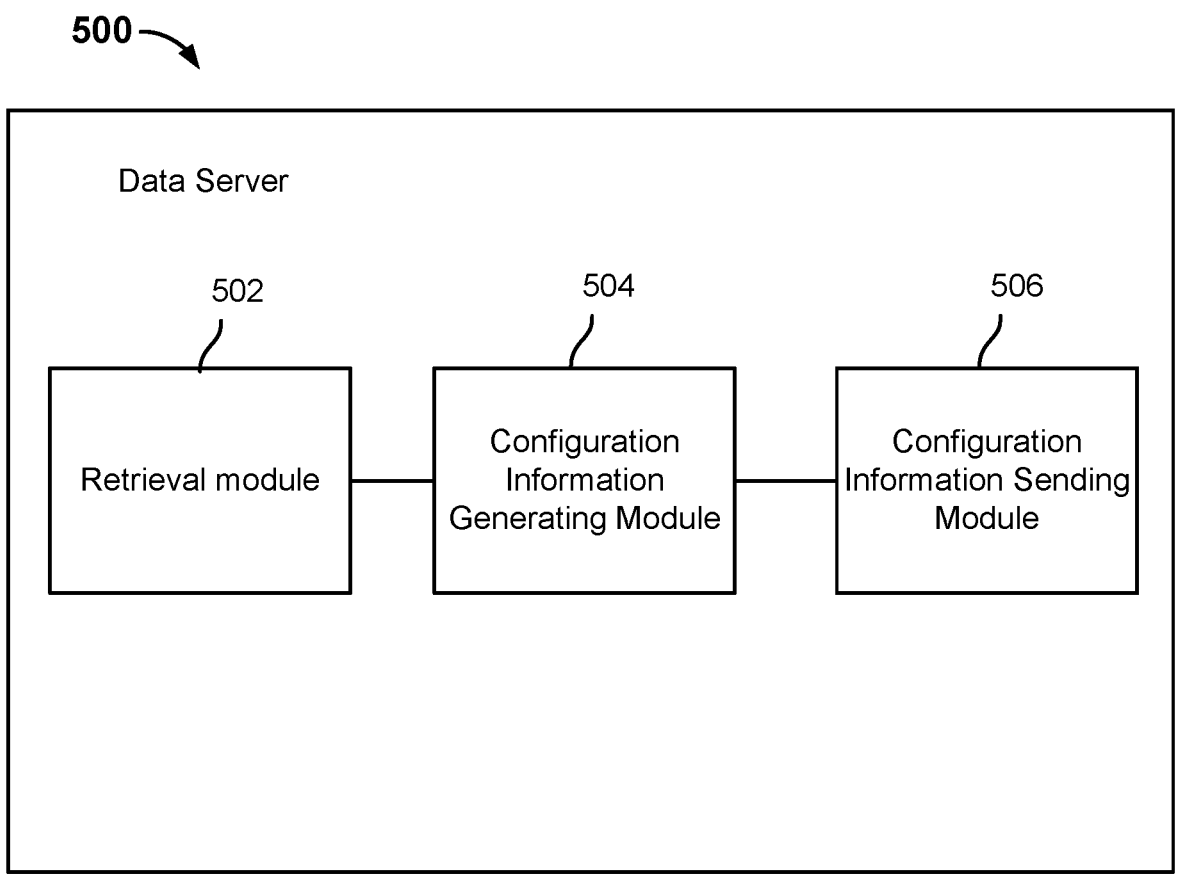
FIG. 5 is a diagram showing an embodiment of a data server.

FIG. 5 is a diagram showing an embodiment of a data server. In the example of FIG. 5, data server 500 includes retrieval module 502, configuration information generating module 504, and configuration information sending module 506.

Retrieval module 502 is configured to retrieve the user data collected by the client device. As mentioned above, examples of user data include the client device's online resource request information and/or information about the client device itself.

Configuration information generating module 504 is configured to tabulate the user data collected by the client device and generate configuration information that can enable client devices to obtain sub-resources associated with various web sources.

For example, the configuration information may include at least one or more of the following: a resource URL corresponding to a web source, names of the sub-resources that are to be obtained to render the web source, URLs of the sub-resources, information (e.g., names or IP addresses) of the cache server at which the sub-resources are stored, and parameters (if any) associated with each sub-resource.

In some embodiments, configuration information generating module 504 is configured to tabulate the user data collected by the client device using the dimensions of the client device and/or the dimensions of the online resource request.

As mentioned above, the dimensions of the client device may include any one or more of the following examples:
the operating system used by the client device.
the operator to which the client device belongs.
the equipment type of the client device.
the location of the client device.

As mentioned above, the dimensions of the online resource request may include any one or more of the following examples:
the URL of the web source.
the type of a sub-resource that is to be loaded for the web source.
the URL of the sub-source that is to be loaded for the web source.
the type of web source.

As mentioned above, among the configuration information regarding the same online resource request, differences exist in one or more of the following areas:
the resource loading information corresponding to different online resource types.
the resource loading information corresponding to different online resource request types.
the resource loading information corresponding to different client device operating systems.
the resource loading information corresponding to different operators.
the resource loading information corresponding to different client equipment types.
the resource loading information corresponding to different locations.
the resource loading information corresponding to different online resource request times.

For example, the resource loading information comprises one or more of the following types of information: the URL of the resource, the resource parameters, and information that identifies (e.g., the address of) the resource cache server.

In some embodiments, configuration information sending module 506 is configured to send generated configuration information to the application server. In some embodiments, the application server is in turn configured to send the configuration information to one or more client devices. In some embodiments, data server 500 is configured to send configuration information to an application server in response to a configuration information retrieval request that is received from the application server.

In some embodiments, configuration information sending module 506 is configured to directly send the configuration information to one or more client devices.

As mentioned above, the online resource request information that is collected by a client device may include one or more of the following types of information, for example:
the time the resource loading was performed based on the online resource request.
the URLs of the sub-resources loaded by the online resource request.
the types of the resources loaded by the online resource request.
the type of online resource request.
information about the resource cache server from which the resource to be loaded is originating based on the online resource request.

As mentioned above, the user data that is collected by a client device may include client device information including one or more of the following kinds of information:
information about the operating system used by the client device.

information about the operator to which the client device belongs.

equipment information of the client device.

location information of the client device.

Figure 6:
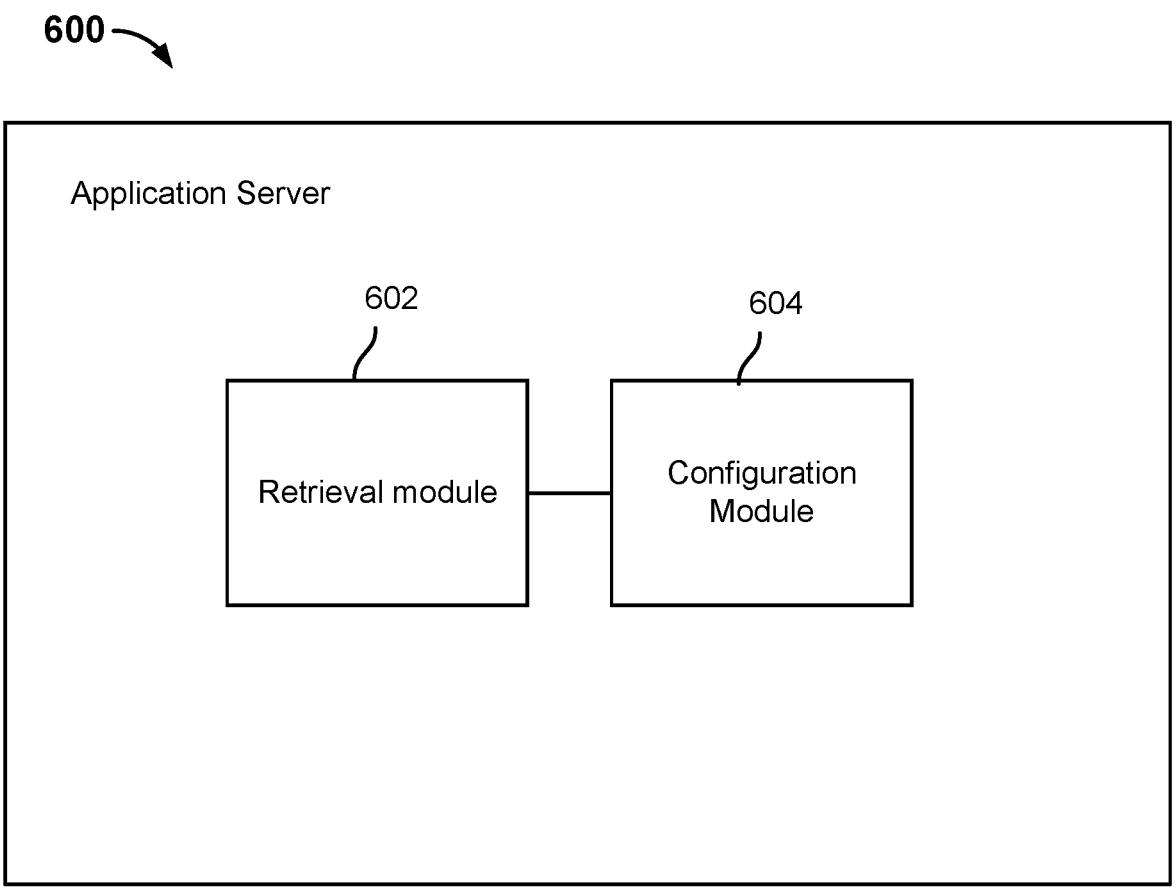
FIG. 6 is a diagram showing an embodiment of an application server.

FIG. 6 is a diagram showing an embodiment of an application server. In the example of FIG. 6, application server 600 includes retrieval module 602 and configuration module 604.

Retrieval module 602 is configured to retrieve the configuration information used to instruct the client device on how to load sub-resources for web sources.

Configuration module 604 is configured to send configuration information to a client device.

In some embodiments, retrieval module 602 is specifically configured to receive a configuration information retrieval request sent by the client device. Retrieval module 602 is then configured to use the configuration information retrieval request to retrieve the configuration information for the client device.

As mentioned above, the configuration information retrieval request may include one or more of the following, for example:

the version of the configuration information.

the operating system used by the client device.

the operator that is used by the client device.

the equipment information of the client device.

the location of the client device.

online resource request information.

In some embodiments, configuration module 604 is specifically configured to determine the configuration information to be sent to the client device based on the dimensions of the client device, the dimensions of the online resource request, or both.

As mentioned above, the dimensions of the client device may include one or more of the following, for example:

the operating system used by the client device.

the operator that is used by the client device.

the equipment type of the client device.

the location of the client device.

As mentioned above, the dimensions of the online resource request may include one or more of the following, for example:

the URL of a web source that is identified by the online resource request.

the types of sub-resource(s) to be obtained for a web source.

the types of web sources.

the URLs, names, parameters, and storage locations of sub-resources that are included in the web page.

In some embodiments, configuration module 604 is specifically configured to determine differences between the most up-to-date version of the configuration information and the version (e.g., as determined by the version number that is sent by the client device via the configuration information retrieval request) that is currently stored at the client device, and send such differences to the client device.

In some embodiments, a configuration management system comprises a data server and an application server. The data server is used to retrieve user data collected by the client device and tabulate the user data collected by the client device to obtain the configuration information that is used to instruct the client device to load the online resource. The application server is configured to retrieve the configuration information (e.g., from the data server) and send it to the client device.

Figure 7A:
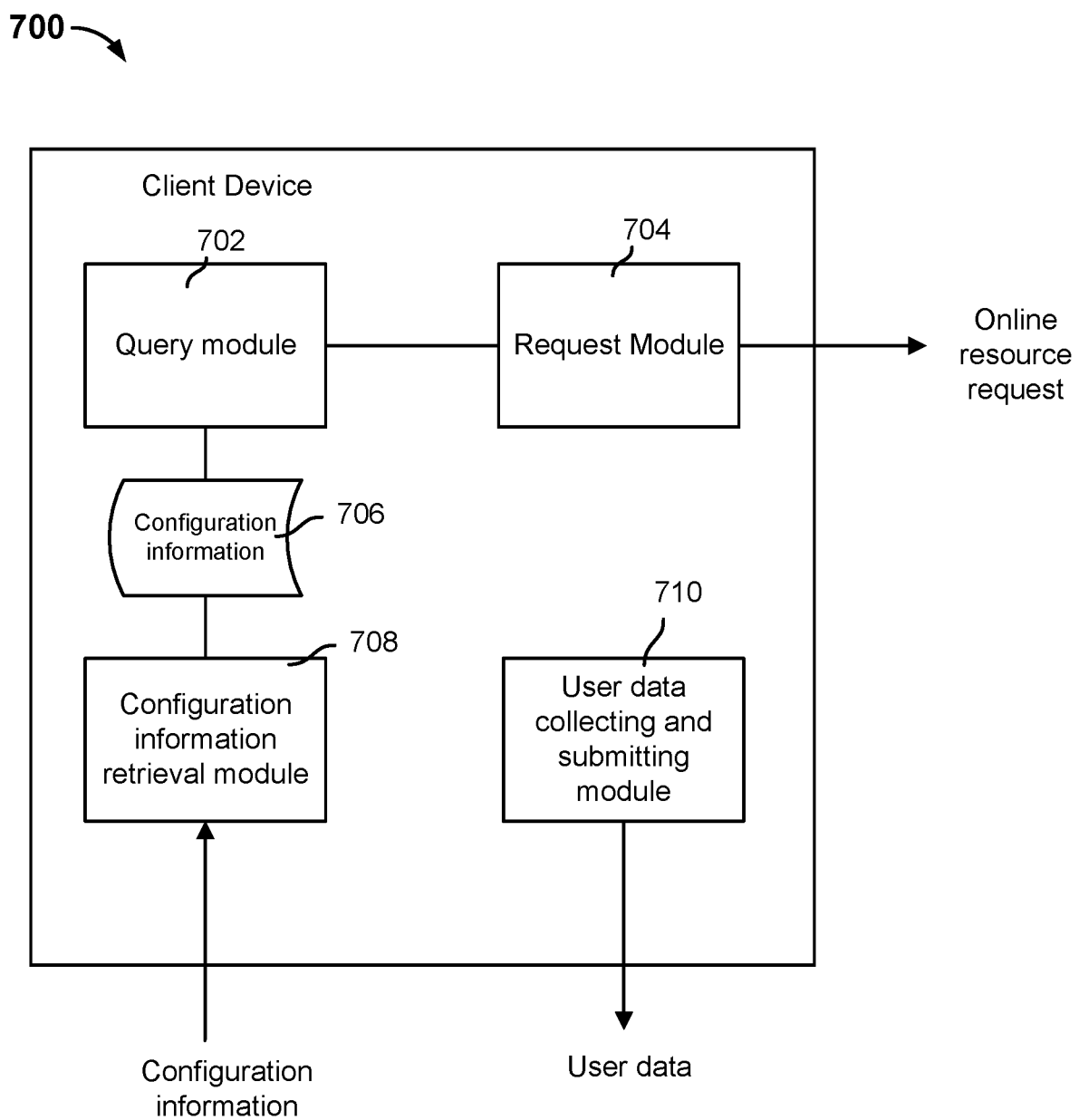
FIG. 7A is a diagram showing an embodiment of a client device.

FIG. 7A is a diagram showing an embodiment of a client device. In the example of FIG. 7A, client device 700 includes query module 702, request module 704, configuration information 706, configuration information retrieval module 708, and user data collecting submitting module 710.

Query module 702 is configured to use a generated online resource request to search for relevant resource loading information from stored configuration information 706.

Request module 704 is configured to send the online resource request based on the obtained resource loading information.

For example, the resource loading information includes one or more of the following: the name of each sub-resource to be obtained to use to render the web source associated with the online resource request, the URL of each sub-resource, the parameters associated with each sub-resource, and the address of the cache server from which to obtain each sub-resource.

In some embodiments, user data collecting and submitting module 710 is configured to collect user data and to submit the collected user data to the data server.

Configuration information retrieval module 708 is configured to send a configuration information retrieval request to the application server and to receive from the application server the configuration information. In some embodiments, the configuration information located on the application server is originally retrieved from the data server.

In some embodiments, the configuration information received by configuration information retrieval module 708 from the application server comprises only new/different content relative to the current version of the configuration information at the client device.

For example, the configuration information retrieval request may include one or more of the following:

the current version information of the configuration information that is stored at the client device.

the location of the client device.

Figure 7B:
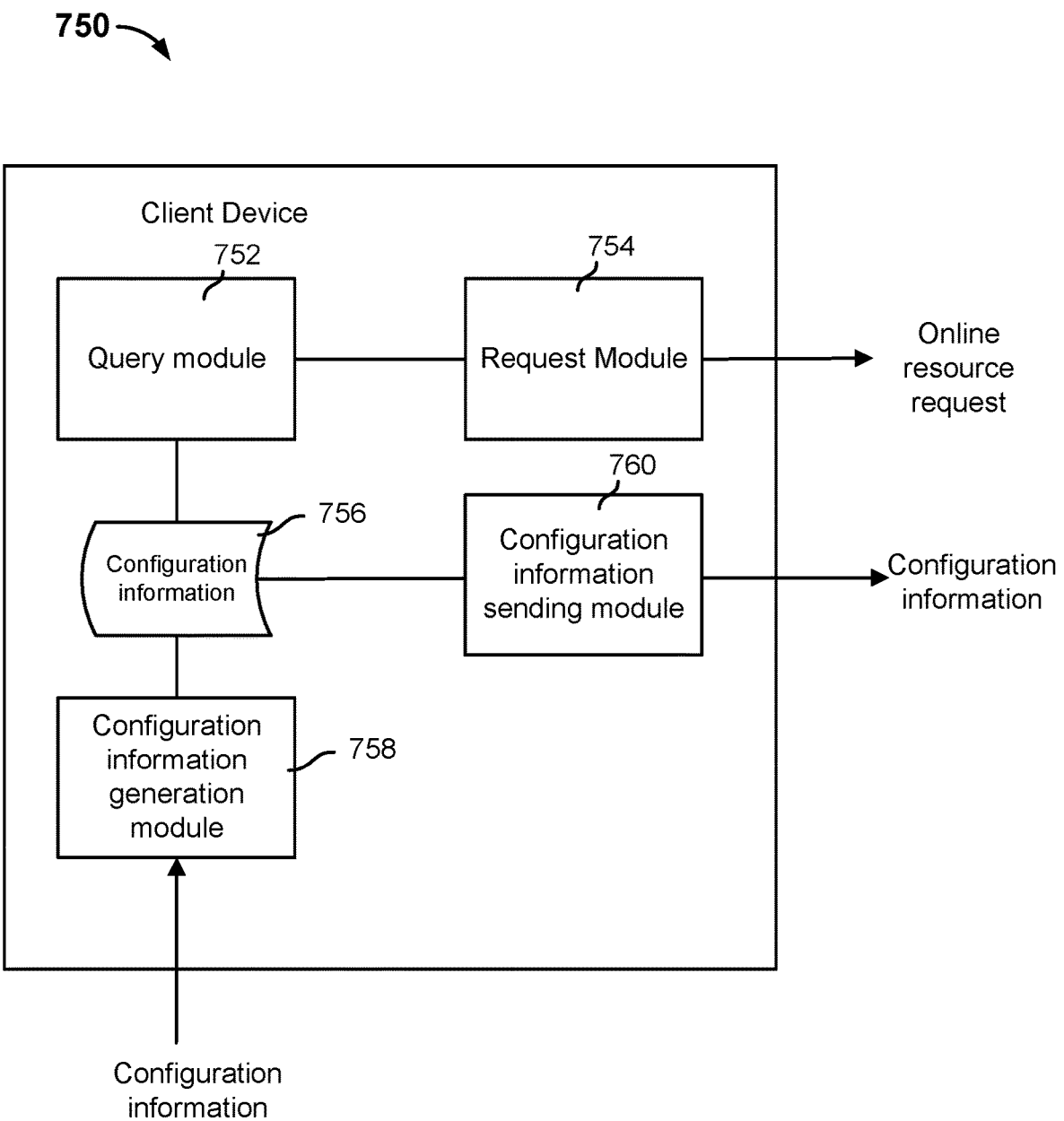
FIG. 7B is a diagram showing another embodiment of a client device.

FIG. 7B is a diagram showing another embodiment of a client device. In the example of FIG. 7B, client device 750 includes query module 752, request module 754, configuration information 756, configuration information generation module 758, and configuration information sending module 760.

Query module 752 may be implemented similarly to query module 702 of client device 700 of FIG. 7A.

Request module 754 may be implemented similarly to request module 704 of client device 700 of FIG. 7A.

Configuration information 756 may be implemented similarly to configuration information 706 of client device 700 of FIG. 7A Configuration information generation module 758 is configured to collect user data based on the historical processing of online resource requests that have taken place at client device 750. Configuration information generation module 758 is further configured to generate configuration information 756 based on the locally collected user data.

In some embodiments, configuration information sending module 760 is configured to send the configuration information to the application server, the application server being used to synchronously provide the configuration information to other client devices. In some embodiments, configuration information sending module 760 is configured to send the configuration information to, or share it with, other client devices.

The modules and sub-modules described above can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules and sub-modules may be implemented on a single device or distributed across multiple devices.

Figure 8:
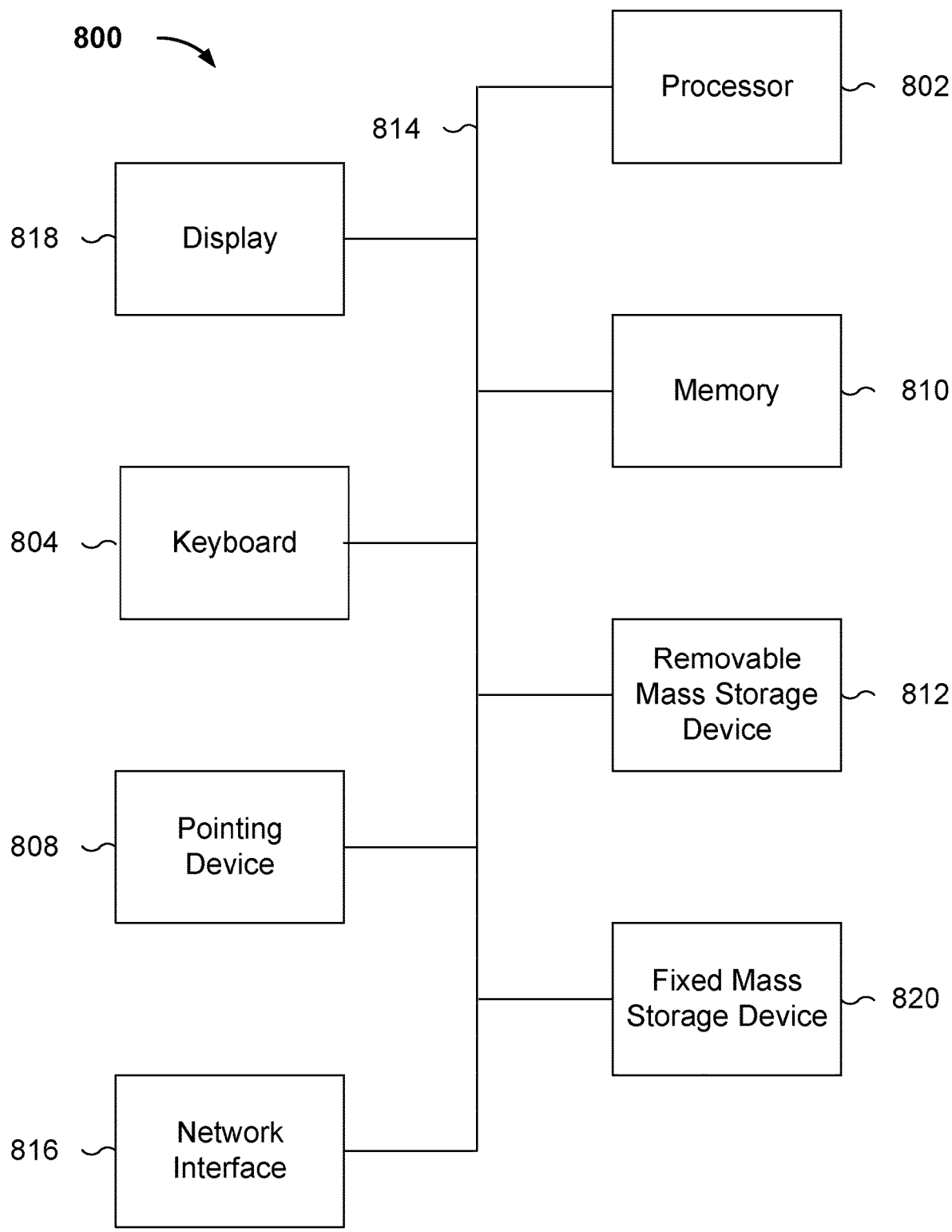
FIG. 8 is a functional diagram illustrating an embodiment of a programmed computer system for generating configuration information for requesting web resources.

FIG. 8 is a functional diagram illustrating an embodiment of a programmed computer system for generating configuration information for requesting web resources. As will be apparent, other computer system architectures and configurations can be used to generate configuration information for requesting web resources. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

For example, computer system 800 may comprise a smart phone or a computer. For example, memory 810 is configured to store program instructions, and processor 802, coupled to memory 810, is configured to read the program instructions stored by memory 810 and, in response, execute steps described in process 200 of FIG. 2, process 300 of FIG. 3, and process 400 of FIG. 4.

The present application is described with reference to flowcharts and/or block diagrams based on the methods, devices (systems), and computer program products offered in the embodiments of the present application. It should be understood that each process and/or block in the flowcharts and/or block diagrams, and combinations of processes and/or blocks in the flowcharts and/or block diagrams, can be realized by computer program commands. These computer program commands can be provided to the processor of a general purpose computer, a specialized computer, imbedded processor, or other programmable data processing equipment to give rise to a machine, such that the commands executed by the processor of the computer or other programmable data processing equipment give rise to a device intended to realize the functions designated in one process or multiple processes in a flowchart and/or one block or multiple blocks in a block diagram.

These computer program commands can also be stored in computer-readable memory that can guide a computer or other programmable data processing equipment to operate in a specified manner, so that the commands stored in this computer-readable memory give rise to a product that includes the command device, and this command device realizes the functions designated in one process or multiple processes in a flowchart and/or one block or multiple blocks in a block diagram.

These computer program commands can also be loaded onto a computer or other programmable data processing equipment, so that a series of operational steps is executed on the computer or other programmable data processing equipment to give rise to computer-realized processing, so that the commands executed on the computer or other programmable data processing equipment provide the steps intended to realize the functions designated in one process or multiple processes in a flowchart and/or one block or multiple blocks in a block diagram.

Although preferred embodiments of the present application have already been described, once persons skilled in the art grasp the basic creative concept, they can make additional modifications to these embodiments. Therefore, the attached claims are intended to be interpreted as including the preferred embodiments and all modifications and revisions that fall within the scope of the embodiments of the present application.

Clearly, persons skilled in the art can make various alterations and transformations to the present application without departing from the spirit and scope of the present application. Thus, if such revisions and transformations to the present application fall within the scope of the claims of the present application and equivalent technologies, the present application also intends to encompass these alterations and transformations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   obtain user data collected by one or more client devices from the one or more client devices, wherein the user data pertains to client device information and online resource request information associated with at least one web source;
   analyze the user data to generate configuration information associated with obtaining a plurality of sub-resources associated with the at least one web source;
   send the configuration information to a recipient client device, wherein the configuration information is configured to enable the recipient client device to obtain the plurality of sub-resources associated with the at least one web source, wherein the configuration information is stored at the recipient client device;
   receive a configuration information retrieval request for requested configuration information from a requesting client device, wherein the configuration information retrieval request includes a version number associated with existing configuration information stored at the requesting client device; and
   obtain the requested configuration information based at least in part on using the version number associated with the existing configuration information stored at the requesting client device to determine new configuration information, if any, to send to the requesting client device; and
   a memory coupled to the processor and configured to provide the processor with instructions.

2. The system of claim 1, wherein the client device information comprises one or more of the following: an operating system used by a client device, an operator that is used by the client device, an equipment type associated with the client device, and a location associated with the client device.

3. The system of claim 1, wherein the online resource request information comprises one or more of the following: a URL associated with the at least one web source, a type of a sub-resource to be obtained for the at least one web source, a type associated with the at least one web source, a URL associated with the sub-resource to be obtained for the at least one web source, a name associated with the sub-resource to be obtained for the at least one web source, a storage location associated with the sub-resource to be obtained for the at least one web source, and a parameter associated with the sub-resource to be obtained for the at least one web source.

4. The system of claim 1, wherein the configuration information retrieval request further comprises one or more of the following: an operating system used by the requesting client device, an operator that is used by the requesting client device, equipment information associated with the requesting client device, a current time associated with the requesting client device, and a current location associated with the requesting client device.

5. The system of claim 4, wherein to obtain the requested configuration information based at least in part on the configuration information retrieval request comprises to:
   use the version number associated with the existing configuration information stored at the requesting client device to determine whether the new configuration information exists; and
   in response to a determination that the new configuration information exists, determine a set of differences between the existing configuration information and the new configuration information, wherein the requested configuration information comprises the set of differences.

6. The system of claim 1, wherein to obtain the requested configuration information based at least in part on the configuration information retrieval request comprises to forward the configuration information retrieval request to a data server, wherein the data server is configured to send back the requested configuration information.

7. The system of claim 1, wherein the configuration information is configured to enable the recipient client device to send a plurality of requests corresponding to respective ones of the plurality of sub-resources at least partially in parallel with sending an online resource request for the at least one web source.

8. A method, comprising:
   obtaining user data collected by one or more client devices from the one or more client devices, wherein the user data pertains to client device information and online resource request information associated with at least one web source;
   analyzing the user data to generate configuration information associated with obtaining a plurality of sub-resources associated with the at least one web source;
   sending the configuration information to a recipient client device, wherein the configuration information is configured to enable the recipient client device to obtain the plurality of sub-resources associated with the at least one web source, wherein the configuration information is stored at the recipient client device;
   receiving a configuration information retrieval request for requested configuration information from a requesting client device, wherein the configuration information retrieval request includes a version number associated with existing configuration information stored at the requesting client device; and obtaining the requested configuration information based at least in part on using the version number associated with the existing configuration information stored at the requesting client device to determine new configuration information, if any, to send to the requesting client device.

9. The method of claim 8, wherein the client device information comprises one or more of the following: an operating system used by a client device, an operator that is used by the client device, an equipment type associated with the client device, and a location associated with the client device.

10. The method of claim 8, wherein the online resource request information comprises one or more of the following: a URL associated with the at least one web source, a type of a sub-resource to be obtained for the at least one web source, a type associated with the at least one web source, a URL associated with the sub-resource to be obtained for the at least one web source, a name associated with the sub-resource to be obtained for the at least one web source, a storage location associated with the sub-resource to be obtained for the at least one web source, and a parameter associated with the sub-resource to be obtained for the at least one web source.

11. The method of claim 8, wherein the configuration information retrieval request further comprises one or more of the following: an operating system used by the requesting client device, an operator that is used by the requesting client device, equipment information associated with the requesting client device, a current time associated with the requesting client device, and a current location associated with the requesting client device.

12. The method of claim 11, wherein the obtaining the requested configuration information based at least in part on the configuration information retrieval request comprises:

using the version number associated with the existing configuration information stored at the requesting client device to determine whether the new configuration information exists; and in response to a determination that the new configuration information exists, determining a set of differences between the existing configuration information and the new configuration information, wherein the requested configuration information comprises the set of differences.

13. The method of claim 8, wherein obtaining the requested configuration information based at least in part on the configuration information retrieval request comprises forwarding the configuration information retrieval request to a data server, wherein the data server is configured to send back the requested configuration information.

14. The method of claim 8, wherein the configuration information is configured to enable the recipient client device to send a plurality of requests corresponding to respective ones of the plurality of sub-resources at least partially in parallel with sending an online resource request for the at least one web source.

15. A client device, comprising:
a processor configured to:
determine an online resource request for a web source;
determine stored existing configuration information associated with the online resource request;
use the stored existing configuration information to generate a plurality of requests associated with obtaining a plurality of sub-resources associated with the web source;
use the plurality of requests to obtain the plurality of sub-resources; and
send a configuration information retrieval request for requested configuration information to an application server, wherein the configuration information retrieval request includes a version number associated with the existing configuration information stored at the client device, wherein the requested configuration information is obtained at the application server based at least in part on using the version number associated with the stored existing configuration information stored at the client device to determine new configuration information, if any, to send to the client device; and
a memory coupled to the processor and configured to provide the processor with instructions.

16. The client device of claim 15, wherein the plurality of requests are sent at least partially in parallel relative to each other.

17. The client device of claim 15, wherein the plurality of requests are sent at least partially in parallel with the online resource request.

18. The client device of claim 15, wherein the configuration information retrieval request further comprises one or more of the following: an operating system used by the client device, an operator that is used by the client device, equipment information associated with the client device, a current time associated with the client device, and a current location associated with the client device.

19. The client device of claim 15, wherein to determine the stored existing configuration information associated with the online resource request comprises to use contextual data to determine a matching set of configuration information that is stored locally at the client device.

20. The client device of claim 19, wherein the contextual data comprises at least one of the following: a current location of the client device and a current time.

* * * * *